Figure 1:
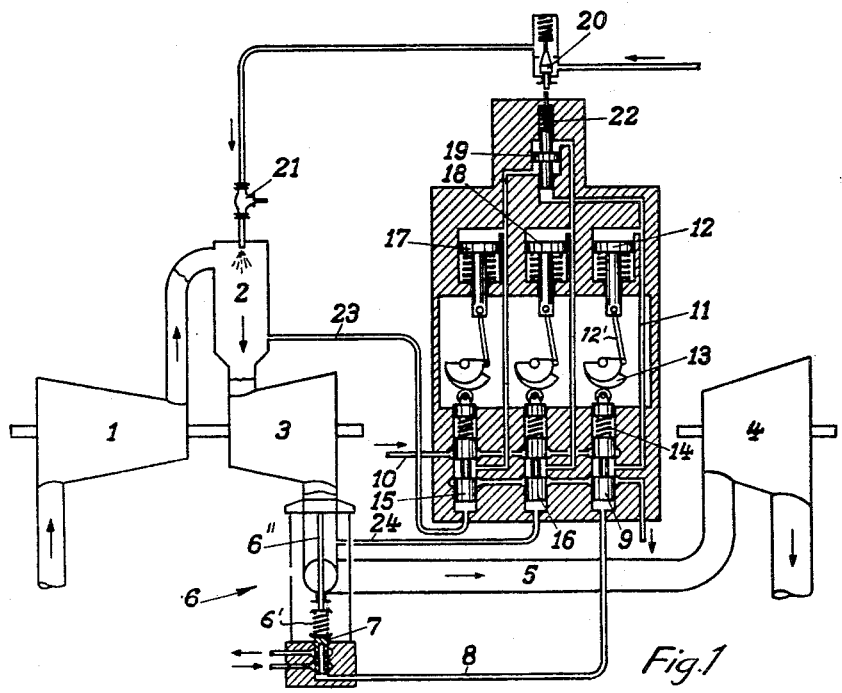

June 3, 1958

W. TRAUPEL 2,836,976

DETERMINING AND CONTROLLING THE INLET
TEMPERATURE OF A GAS TURBINE

Filed Aug. 11, 1954

INVENTOR.
WALTER TRAUPEL

BY

ATTORNEY.

United States Patent Office

2,836,976
Patented June 3, 1958

2,836,976

DETERMINING AND CONTROLLING THE INLET TEMPERATURE OF A GAS TURBINE

Walter Traupel, Zurich, Switzerland, assignor to Sulzer Frères, Société Anonyme, Winterthur, Switzerland, a corporation of Switzerland Application August 11, 1954, Serial No. 449,196

Claims priority, application Switzerland August 13, 1953

1 Claim. (Cl. 73—346)

The present invention relates to means for determining and controlling the inlet temperature of a gas turbine.

The temperature of the gas at the inlet of a gas turbine must be checked and maintained at a predetermined value or within a predetermined range, the control of the temperature being effected either by hand or automatically.

To accomplish this, the inlet temperature must be measured. It is difficult to indicate the inlet temperature by means of a conventional temperature feeler. A temperature feeler suitable for use in the hot gas stream at the turbine inlet must be robust. For this reason, and because the feeler must be relatively bulky in order to measure the mean temperature in the space at the turbine inlet, the heat capacity of such a feeler is great and the temperature is indicated sluggishly by the feeler. If the combustion chamber is arranged close to the gas turbine, it may be difficult to find sufficient space for a large temperature feeler, and it is more difficult still to make the feeler so that it indicates the mean temperature of the relatively hot and cool gas streams which are not yet properly mixed at the outlet of the combustion chamber and which are not completely mixed until they leave the gas turbine. If the gas inlet conduit is provided with a double wall, installation of a suitable temperature feeler may be very difficult.

An object of the present invention is the provision of an apparatus for determining the inlet temperature of a gas turbine by computing the outlet temperature, the inlet pressure, and the outlet pressure of the turbine. Arrangement of a temperature feeler in the hot gas conduit at the turbine inlet is thereby avoided and consequently all difficulties are eliminated which are involved in the arrangement of a temperature feeler at the inlet of a gas turbine.

Computation of the outlet temperature $T_2$, of the inlet pressure $p_1$, and of the outlet pressure $p_2$ of the turbine may be done according to the following formula:

$$\log T_1 = \log T_2 + \eta \cdot \frac{\chi - 1}{\chi} (\log p_1 - \log p_2)$$

in which $T_1$ represents the temperature at the inlet of the gas turbine, $\eta$ represents the internal efficiency of the gas turbine, and $\chi$ represents the ratio of the specific heat at constant pressure and the specific heat at constant volume of the gas operating the gas turbine.

The mechanism according to the invention comprises means for measuring the outlet temperature, the inlet pressure and the outlet pressure of the turbine and means for determining the inlet temperature of the gas turbine by computing the aforementioned values.

For measuring the values of the outlet temperature $T_2$, the inlet pressure $p_1$ and the outlet pressure $p_2$, means may be provided for transforming the individual values into individual forces and for transforming the individual forces into individual fluid pressures which are proportional to the logarithms of the measured values. The fluid pressures may be made to act on individual piston surfaces of a spring loaded piston unit, so that the positions of the piston unit effected by the fluid pressures and the spring indicate the temperature $T_1$ at the gas turbine inlet which is computed of the measured values according to the formula $$\log T_1 = \log T_2 + \eta \cdot \frac{\chi - 1}{\chi} (\log p_1 - \log p_2)$$

Figure 2:
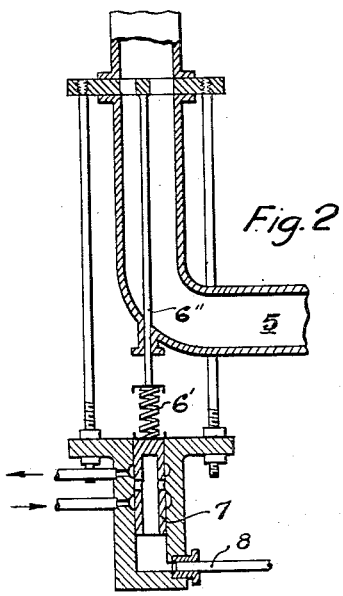

The novel features which are considered characteristic of the invention are set forth with particularity in the appended claims. The invention itself however and additional objects and advantages thereof will best be understood from the following description of an embodiment thereof when read in conjunction with the accompanying drawing, in which Figure 1 shows a diagrammatic layout of a gas turbine plant and a schematic part sectional view of a mechanism according to the invention connected with the plant and in which Fig. 2 is a diagrammatic large scale illustration of a thermostat and valve operated thereby as used in connection with the illustrated embodiment of the invention.

Referring more particularly to the drawing, numeral 1 designates a compressor, numeral 2 designates a combustion chamber, numeral 3 designates a high-pressure gas turbine driving the compressor 1, and numeral 4 designates a low pressure gas turbine which produces outside power. In order to measure the outlet temperature $T_2$ of the gas turbine 4, a temperature feeler 6 is arranged in the conduit 5 connecting the outlet of the turbine 3 with the inlet of the turbine 4. The temperature feeler 6 is in the form of a conventional thermostat having a rod 6" which expands when heated and actuates by means of a spring 6' a conventional piston valve 7 controlling the flow of a pressure fluid into and out of a conduit 8 which connects the valve 7 with a cylinder at the underside of a piston valve 9. The temperature to which the thermostat shown in larger scale in Fig. 2 is responsive is transformed into a force actuating the piston valve 9. If, for example, the temperature rises, the force is increased and the piston valve 9, whose top side is loaded by a spring 14, is slightly lifted, so that a pressure fluid is conducted from a supply conduit 10 through a conduit 11 into the space above a piston 12. The latter is thereby pressed downward and rotates a cam 13 to which it is connected by a piston rod 12'. Rotation of the cam 13 produces increased tension of the spring 14, so that the piston valve 9 is returned to its original position. In this way, a predetermined pressure above the piston 12 is coordinated to the pressures prevailing in the conduit 8. The manner of coordination depends on the configuration of the cam 13. The latter may be so formed that the pressure above the piston 12 is proportional to the logarithm of the temperature $T_2$ which controls the pressure in the conduit 8.

The pressure at the outlet of the turbine 3 is transmitted through a conduit 24 to a cylinder below a piston valve 16, and the inlet pressure of the turbine 3 is transmitted by duct 23 to a cylinder below a piston valve 15. The piston valves 15 and 16 control the flow of pressure fluid from a supply conduit 10 into cylinder space above pistons 18 and 17, respectively, in the same manner as the piston valve 9 controls the flow of pressure fluid into a cylinder space on top of the piston 12. The pressures produced above the pistons 18 and 17 are proportional to the logarithms of the pressures $p_2$ and $p_1$, respectively.

The pressures acting on top of the pistons 12, 17, and 18 are made to individually act on different surfaces of a step piston 19, the pressures above pistons 12 and 17 acting on the undersides of the step piston to move the latter upward, and the pressure on top of the piston 18 acting on the top side of the step piston 19, tending to move the step piston downward. The step piston moves upward against the force of a coil spring 22, and the surfaces of the step piston 19, and the tension of the spring 22 can be arranged so that the movement of the piston corresponds to the formula $$\log T_1 = \log T_2 + \eta \cdot \frac{\chi-1}{\chi}(\log p_1 - \log p_2)$$

The position taken up by the piston unit 19 due to the action of the spring 22 and to the three different fluid pressures produced by the temperature feeler at the outlet of the turbine 3 and by the inlet and outlet pressures of the turbine 3 corresponds to the logarithm of the inlet temperature $T_1$ of the turbine 3 and consequently indicates the inlet temperature of the gas turbine.

The illustrated example is for the purpose of preventing the rise of the inlet temperature of the turbine 3 above a value which is determined by the movement of the piston 19. If this movement exceeds a predetermined value in upward direction, a pin connected to the top of the piston 19 actuates a fuel control valve 20, tending to close the latter. The fuel supply to the combustion chamber 2, which is normally controlled by hand or automatically by operating a valve 21 in the fuel supply conduit, is reduced by the automatic actuation of the valve 20 when the inlet temperature of the gas turbine exceeds a predetermined value. The step piston 19 may be used to actuate a conventional temperature control system which adjusts the fuel supply until the desired inlet temperature is obtained.

The step piston 19 coordinates the pressures above the pistons 17, 18, and 12 which corresponds to the logarithms of the inlet pressure of the turbine, the outlet pressure of the turbine, and the outlet temperature of he turbine, respectively, according to the ratio defined by formula $$\eta \cdot \frac{\chi-1}{\chi}$$

The illustrated example shows a case in which the inlet pressure as well as the outlet pressure of the gas turbine varies, so that both pressures must be measured. If the turbine exhausts into the atmosphere, so that its back pressure is almost constant, it is sufficient to measure the inlet pressure $p_1$. The control mechanism is correspondingly simplified. The invention is applicable to open-cycle, semi-closed and closed cycle gas turbine plants.

What is claimed is:

An apparatus for measuring the inlet temperature $T_1$ of a gas turbine comprising means responsive to and actuated by the outlet temperature $T_2$ of the turbine for producing a force corresponding to the outlet temperature of the turbine, means for transforming said force into a fluid pressure which is proportional to the logarithm of the outlet temperature of the turbine, means responsive to the inlet pressure $p_1$ of the turbine and transforming the turbine inlet pressure into a fluid pressure which is proportional to the logarithm of the inlet pressure of the turbine, means responsive to the outlet pressure $p_2$ of the turbine and transforming the turbine outlet pressure into a fluid pressure which is proportional to the logarithm of the outlet pressure of the turbine, and means jointly actuated by the aforesaid three fluid pressures and coordinating said fluid pressures according to the ratio defined by the formula $$\eta \cdot \frac{\chi-1}{\chi}$$

in which $\eta$ stands for the internal efficiency of the turbine and $\chi$ stands for the ratio between the specific heats at constant pressure and at constant volume of the gases operating the turbine for transforming said fluid pressures into a force indicating the logarithm of the inlet temperature of the turbine according to the formula $$\log T_1 = \log T_2 + \eta \cdot \frac{\chi-1}{\chi}(\log p_1 - \log p_2)$$

References Cited in the file of this patent

UNITED STATES PATENTS

| | | |
|---|---|---|
| 2,095,991 | Lysholm | Oct. 19, 1937 |
| 2,507,498 | Brown | May 16, 1950 |
| 2,549,623 | Moore | Apr. 17, 1951 |

OTHER REFERENCES

Report No. 898, N. A. C. A., "Pressure Sensitive System for Gas-Temperature Control," by Cesaro and Matz, pages 99–105, March 4, 1948.